United States Patent [19]

Baheri

[11] E Patent Number: Re. 33,661

[45] Reissued. Date of Patent: Aug. 13, 1991

[54] HEAD POSITIONING ASSEMBLY

[75] Inventor: Hamid Baheri, Newport Beach, Calif.

[73] Assignee: Archive Corporation, Costa Mesa, Calif.

[21] Appl. No.: 564,864

[22] Filed: Jul. 6, 1990

Related U.S. Patent Documents

Reissue of:

[64] Patent No.: 4,833,558
Issued: May 23, 1989
Appl. No.: 856,055
Filed: Apr. 25, 1986

[51] Int. Cl.[5] ..... G11B 5/55; G11B 5/56; G11B 5/48

[52] U.S. Cl. ..... 360/106; 360/104; 360/109

[58] Field of Search ..... 360/104, 106, 109

[56] References Cited

U.S. PATENT DOCUMENTS

| | | | |
|---|---|---|---|
| 3,613,214 | 10/1971 | MacArthur | 360/109 |
| 3,809,927 | 5/1974 | Oyaba | 360/106 |
| 3,833,922 | 9/1974 | DeBell et al. | 360/105 |
| 3,924,823 | 12/1975 | Cohen et al. | 242/198 |
| 3,964,098 | 6/1976 | Kramer et al. | 360/93 |
| 3,976,262 | 8/1976 | Kennedy | 360/96 |
| 3,977,625 | 8/1976 | Maxwell, Jr. et al. | 242/198 |
| 4,003,092 | 1/1977 | Hirata | 360/109 |
| 4,005,493 | 1/1977 | Morgan | 360/106 |
| 4,071,866 | 1/1978 | Butsch | 360/106 |
| 4,085,906 | 4/1978 | Dahl et al. | 242/198 |
| 4,099,686 | 7/1978 | Moya | 242/198 |
| 4,199,795 | 4/1980 | Hunter | 360/93 |
| 4,212,043 | 7/1980 | Baker | 360/104 |
| 4,216,508 | 8/1980 | Hunter | 360/93 |
| 4,270,155 | 5/1981 | Bejerano | 360/106 |
| 4,303,955 | 12/1981 | Kramer et al. | 360/93 |

FOREIGN PATENT DOCUMENTS

| | | | |
|---|---|---|---|
| 021326 | 1/1981 | European Pat. Off. . | |
| 0109154 | 5/1984 | European Pat. Off. . | |
| 0210026 | 1/1987 | European Pat. Off. . | |
| 60-85413 | 5/1985 | Japan | 360/109 |
| 60-163223 | 8/1985 | Japan | 360/109 |
| 61-8718 | 1/1986 | Japan | 360/109 |

OTHER PUBLICATIONS

Bauck et al., IBM/TDB, "Head Adjustment for Disk", vol. 21, No. 12, May 1979, pp. 4781–4782.

Patent Abstract of Japan, vol. 3, No. 81, Jul. 12, 1979, and JP-A-5459121; 05-12-79.

*Primary Examiner*—John H. Wolff

*Attorney, Agent, or Firm*—Knobbe, Martens, Olson & Bear

[57] ABSTRACT

A magnetic read/write head is mounted on a carriage having a bore therein. The carriage is slidable along a stationary guide rod which extends into the bore. A lead screw threads into a nut which is keyed to the carriage so that rotation of the lead screw moves the carriage along the guide rod. A torsion spring engages the carriage and provides a force to bias the carriage so as to eliminate any undesired clearance between the carriage and the nut and between the carriage and the guide rod. The force is applied at an angle relative to the axis of motion of the carriage. As the carriage moves, the spring is deflected, causing the angle of the force to change and the amount of the force to change. The spring is oriented so that the total force directed parallel to the axis of the motion of the carriage remains constant. The amount of the total force is predetermined to minimize vibration of the carriage and head. The carriage is guided by the guide rod, not the lead screw, so that misalignment of the lead screw does not affect the positioning of the head. A second guide rod extends into a half-bore in the carriage to prevent rotation of the carriage about the lead screw.

(List continued on next page.)

26 Claims, 3 Drawing Sheets

US PATENT DOCUMENTS

| | | | |
|---|---|---|---|
| 4,313,143 | 1/1982 | Zarr | 360/106 |
| 4,333,116 | 6/1982 | Schoettle et al. | 360/109 |
| 4,337,908 | 7/1982 | Sims, Jr. | 242/198 |
| 4,376,961 | 3/1983 | Torii et al. | 360/106 |
| 4,489,355 | 12/1984 | Rudi | 360/96.5 |
| 4,514,775 | 4/1985 | Manning et al. | 360/96.6 |
| 4,528,607 | 7/1985 | Thompson | 360/106 |
| 4,559,571 | 12/1985 | Olmstead et al. | 360/105 |
| 4,573,091 | 2/1986 | Barton, Jr. et al. | 360/93 |
| 4,587,587 | 5/1986 | Miller | 360/109 |
| 4,608,615 | 8/1985 | Zeavin | 360/96.5 |
| 4,609,956 | 9/1986 | Torii et al. | 360/106 |
| 4,609,958 | 9/1986 | Irvin et al. | 360/106 |
| 4,609,959 | 9/1986 | Rudi | 360/106 |
| 4,622,606 | 11/1986 | Rudi | 360/105 |
| 4,694,367 | 9/1987 | Brent | 360/106 |
| 4,747,004 | 5/1988 | Kukreja et al. | 360/106 |
| 4,750,067 | 6/1988 | Gerfast | 360/106 |

Fig. 1
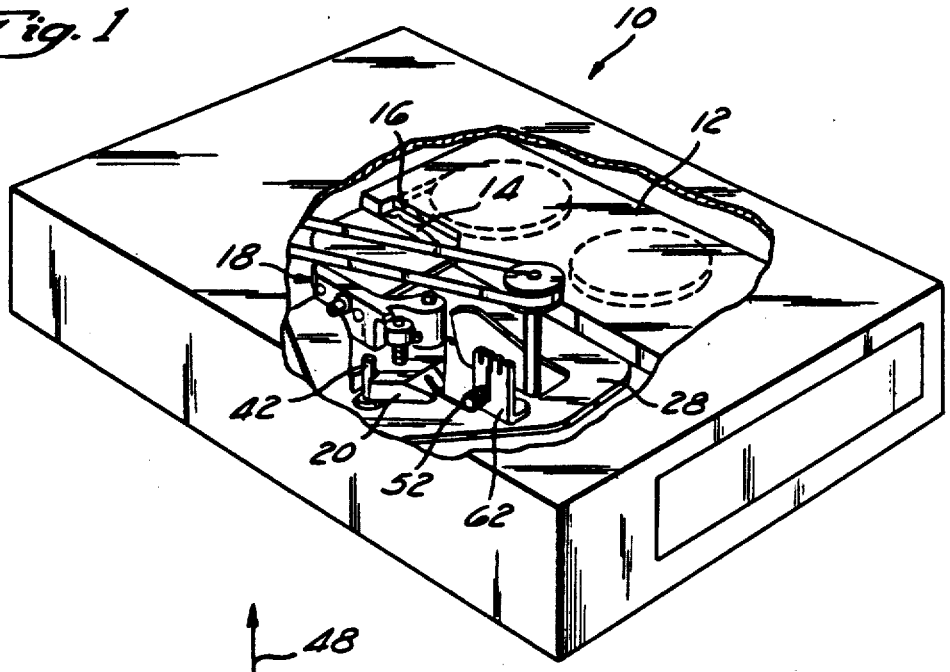
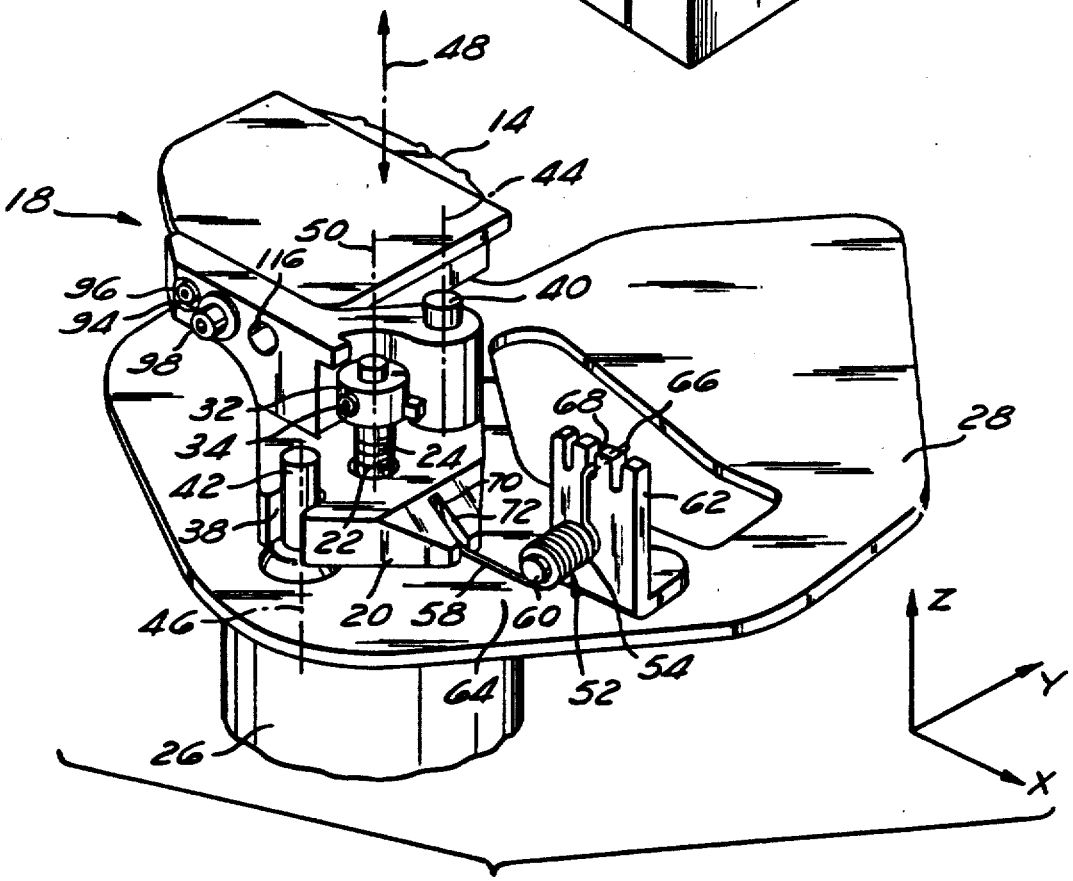
Fig. 2

HEAD POSITIONING ASSEMBLY

Matter enclosed in heavy brackets [ ] appears in the original patent but forms no part of this reissue specification; matter printed in italics indicates the additions made by reissue.

BACKGROUND OF THE INVENTION

The present invention relates generally to tape drives, and more particularly to an apparatus which positions a magnetic read/write head relative to a length of magnetic tape. The disclosure of commonly assigned U.S. patent application Ser. No. 849,140 now abandoned filed Apr. 7, 1986 and entitled "Cartridge Loading Apparatus", is hereby incorporated by reference.

Many small business and personal computer systems utilize backup memory devices in the event of a malfunction in the principal memory device of the computer. Previously, floppy disk drive units have been used to store data in such an event. As an alternative to floppy disk drives, streaming tape drives have been developed as a means for storing data on a length of ¼" wide magnetic tape which is wound within a tape cartridge. As a backup memory device, tape drives are preferable to floppy disk drives because tape drives have a much greater storage capacity, and can load data onto a computer much more quickly.

To store as much data as possible on the magnetic tape, the data is recorded on a number of parallel, longitudinally oriented tracks on the tape. In order to read and write the data onto the tape in separate tracks, the magnetic head must be able to move transversely across the tape in increments as small as the width of a track, and be maintained in the proper orientation at each track. Typically, a led screw driven by a stepper motor is provided for this purpose. The head is mounted on a positioning apparatus which threads onto the lead screw so that for a given amout of rotation of the lead screw, the head is displaced a predetermined distance across the tape. Alternatively, the motor may cause the lead screw to move in a linear fashion, as opposed to rotating. In such a case, the lead screw is not necessarily threaded onto the head positioning apparatus.

One way to increase the data storage capacity of the tape is to divide the tape into more tracks which are smaller in width. As a result, the head must be positioned with even greater precision. Thus, the clearance between the head positioning apparatus and the lead screw must be minimized to prevent motion of the head other than when the lead screw is in motion. Previously, springs have been provided to bias the head positioning apparatus relative to the lead screw to eliminate any clearance therebetween.

However, the head positioning apparatus is still subject to motion due to disturbance which may vibrationally excite the apparatus and cause the head to resonate. Most notably, the apparatus will be vibrated by the motor, which often overshoots and causes the lead screw to oscillate about a desired position. The resulting vibration will be of an amplitude large enough to affect the desired precision of the orientation of the head.

The spring will load the motor by providing resistance to motion of the head, which helps to dampen vibration of the head positioning apparatus. Since the load on the motor is a function of the spring force, if the spring force were to remain constant at a predetermined level, the precise amount of damping could be provided to cause the head to reach an equilibrium position quickly and with a minimum of oscillation. However, as the head is moved, the spring is deflected and the spring force varies. This is because the spring force is generally proportional to the degree of deflection of the spring. Thus, the spring force and its damping characteristics will vary as the head moves, potentially subjecting the head to significant vibration.

Further, it is desirable for the head positioning apparatus to occupy as little space as possible. This enables the external dimensions of the tape drive to be minimized, so that the tape drive can fit within a standard size enclosure within a computer. For example, a tape drive manufactured in accordance with the "5¼ inch half height form factor" set forth by ANSI must have a width of no more than 5¾ inches, a height of no more than 1⅝ inches, and a depth of no more than 8 inches. Unfortunately, as the spring is reduced in size to save space, the spring is more likely to behave in a "non-linear" fashion. That is, the spring force will vary to a greater degree for a given amount of deflection of the spring. As a result, it becomes even more difficult to maintain a constant load on the motor which will dampen vibrations.

Thus, a need exists for a compact head positioning apparatus which dampens vibration and allows precise positioning of a magnetic head so that multiple tracks of data may be recorded on a length of magnetic tape.

SUMMARY OF THE INVENTION

The present invention is an apparatus for mounting a magnetic head on an extremely threaded lead screw so that rotation of the lead screw precisely positions the magnetic head relative to a magnetic data storage medium, such as magnetic tape.

The present apparatus comprises a carriage on which the head is mounted. The carriage has a bore through which a stationary guide rod passes with a minimal clearance. The carriage is slidable along the guide rod to vary the position of the head relative to the tape. A stationary anti-rotation rod extends also through the carriage to prevent rotation of the carriage. The lead screw passes through an unthreaded aperture in the carriage. A nut threads onto the lead screw and keys into a depression in the carriage so that rotation of the lead screw causes the carriage to slide along the guide rod.

An important feature of the present invention is the interaction between the carriage and the nut. The carriage is moveable in virtually all directions while maintaining contact with the nut, so as to "float" on the nut. This allows the carriage to be precisely positioned along the guide rod without being affected by misalignment of the lead screw. As a result, the lead screw does not need to be oriented with a high degree of accuracy, which simplifies the overall construction of the apparatus.

Another significant feature of this invention is the manner in which the carriage is biased relative to the lead screw and the guide rods. In the preferred embodiment, a torsion spring has a longitudinal axis oriented substantially normal to the axis of motion of the carriage, so that the spring consistently biases the carriage relative to the lead screw and the guide rods. As a result, this spring substantially eliminates any clearance which may allow "play" or undesired motion of the head.

The spring is advantageously oriented so that the force applied to the carriage is directed at an angle relative to the axis of motion of the carriage. As the spring is deflected due to motion of the carraige, this angle changes, as does the amount of the force. As a result, the relationship between the angle and the spring force is such that the total force directed parallel to the axis of motion of the carriage remains substantially constant throughout the range of motion of the carriage. The amount of the total force in this direction is predetermined to provide the precise amount of load on the motor required to dampen vibration created by overshooting of the motor. The head is therefore quickly and precisely positioned.

A further advantage of the invention is that a constant load on the motor can be maintained even with a small spring, which facilitates compliance with industry standard dimensions for the tape drive.

Another aspect of the invention is the adjustability of the head. This feature allows the orientation of the head to be adjusted relative to the tape once the apparatus is installed within a tape drive, to compensate for misalignment of the head due to tolerances in the various parts forming the head positioning assembly. Advantageously, the head can be rotated about a single axis to adjust its orientation without affecting the orientation of the head about any other axes. Precise adjustments in the orientation of the head can be made manually with a special tool disclosed herein.

BRIEF DESCRIPTION OF THE DRAWINGS

FIG. 1 is a cutaway perspective view of a tape drive in which a head positioning assembly according to a preferred embodiment of the present invention is mounted.

FIG. 2 is a perspective view of the present head positioning assembly.

FIG. 4b is a schematic representation of the spring in the position shown in FIG. 4a.

FIG. 5b is a schematic representation of the spring in the position shown in FIG. 5a.

DETAILED DESCRIPTION OF A PREFERRED EMBODIMENT

Figure 3:
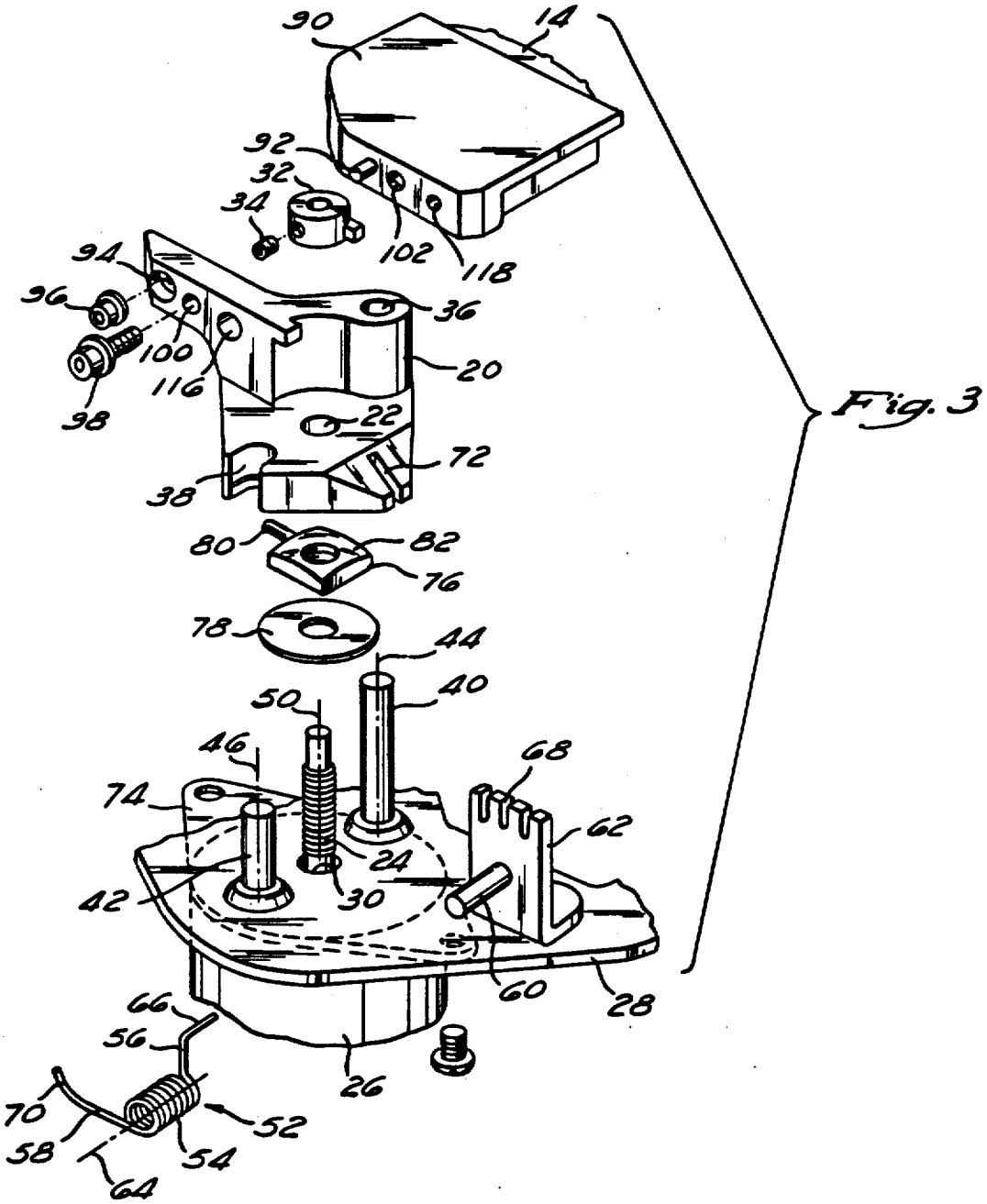
FIG. 3 is an exploded view of the present head positioning assembly.

FIG. 1 shows a tape drive 10 which is used to store data on a tape cartridge 12. A magnetic head 14 engages a length of magetic tape 16 wound within the cartridge 10. The head 14 is mounted on a head positioning apparatus 18 which enables the head 14 to move transversely across the tape 16, so that multiple tracks of data may be recorded on the tape 16.

The head positioning apparatus 18 is shown in more detail in FIGS. 2 and 3. For reference purposes, orthogonal x, y and z axes are shown in FIG. 2. The head 14 is mounted on a carriage 20. An unthreaded aperture 22 extends through the carriage 20. One end of an externally threaded lead screw 24 passes through the aperture 22 with sufficient clearance to prevent the lead screw 24 from engaging the carriage 20. The other end of the lead screw 24 is attached to a stepper motor 26. Rotation of the motor 26 causes the lead screw 24 to rotate. A substantially planar flange 74 on the motor 26 is bolted to the underside of a base plate 28, which in turn is secured to the tape drive 10. As shown in FIG. 3, the lead screw 24 extends through an opening 30 in the base plate 28. An annular collar 32 is fixed onto the end of the lead screw 24 by means of a set screw 34.

Figure 4A:
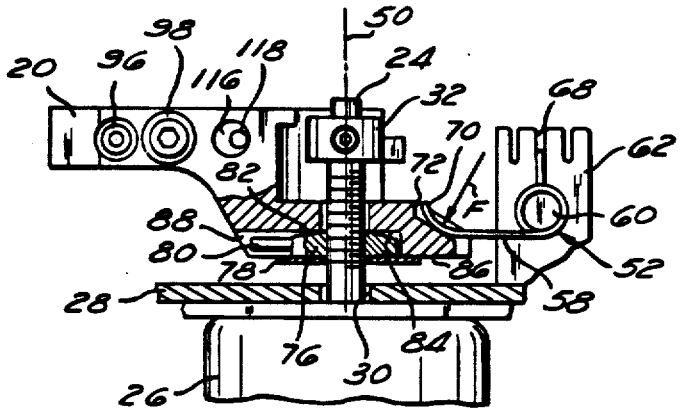
FIG. 4a is a side elevation of the present head positioning assembly with the head in a lowered position.
Figure 5A:
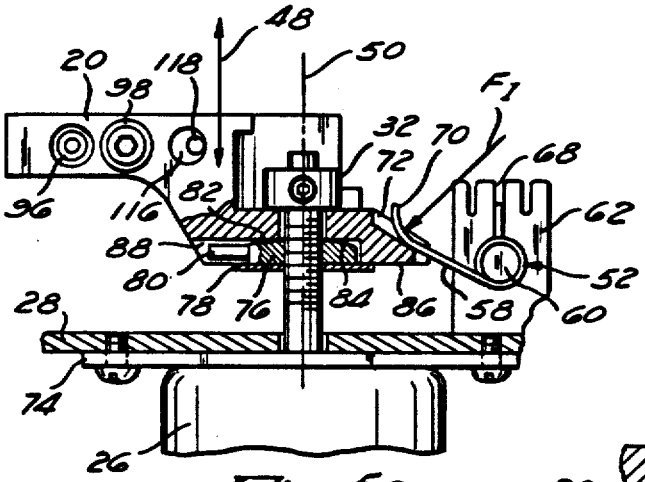
FIG. 5a is a side elevation of the present head positioning assembly with the head in a raised position.

As shown in FIGS. 3, 4a and 5a, an internally threaded nut 76 is threaded onto the lead screw 24, and is positioned between the carriage 20 and the base plate 28. Directly beneath the nut 76, an annular washer 78 surrounds the lead screw 24. The exterior of the nut 76 is substantially square. An elongated key 80 protrudes radially outwardly from the nut 76, and is substantially normal to one side of the nut. The nut 76 has a spherically rounded top surface 82. The nut 76 nests within a depression 84 on the underside 86 of the carriage 20.

Figure 6:
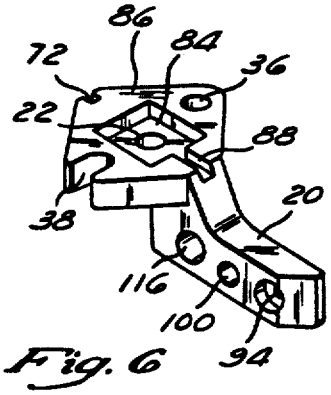
FIG. 6 is a perspective view of the underside of the carriage.

As is best shown in FIG. 6, the depression 84 includes an elongated groove 88. When the top surface 82 of the nut 76 engages the carriage 20, the key 80 will mate with the groove 88 and prevent rotation of the carriage 20 relative to the nut 76, about a longitudinal axis 50 of the lead screw 24. The rounded top surface 82 of the nut 76 allows the carriage 20 to "float" on the nut 76, or move freely in virtually all directions while still maintaining contact with the nut 76. The washer 78 is bonded to the underside 86 of the carriage 20 to prevent the nut 76 from becoming dislodged from the depression 84.

A cylindrical bore 36 extends through the carriage 20. Similarly, the half-bore 38 with a semi-circular surface extends completely through the carriage 20. A pair of stationary, cylindrical guide rods 40, 42 extend vertically upwardly from the base plate 28. The rods 40, 42 have respective longitudinal axes 44 and 46, which are substantially parallel to each other. The rod 40 is longer than the rod 42, and extends through the bore 36 with minimal clearance. The rod 42 extends through the half-bore 38. The function of the rod 42 and half-bore 38 is to prevent rotation of the head 14 in a horizontal or x-y plane. Excessive rotation in the x-y plane will cause undesirable changes in the tape wrap angle, that is, the manner in which the tape 16 engages the head 14.

The carriage 20 is slidable relative to the rods 40, 42 in either direction along the z-axis, or an axis of motion 48. The axis of motion 48 of the carriage 20 is parallel to the longitudinal axes 44, 46 of the rods 40, 42, and also parallel to the longitudinal axis 50 of the lead screw 24. The rod 40 guides the carriage 20 and insures that the motion of the head 14 is in a straight line.

The carriage 20 is biased relative to the lead screw 24 and the rods 40,42 by a torsional coil spring 52. The spring 52 has a helically wound portion 54 and a pair of arms 56, 58 extending radially outwardly from each end of the wound portion 54. The wound portion 54 is mounted on a substantially horizontal, cylindrical post 60. The post 60 is stationary and fixed to a substantially planar support member 62 which extends vertically upward from the base plate 28. The spring 52 has a longitudinal axis 64 which extends through the wound portion 54. The longitudinal axis 64 of the spring 52 is oriented substantially normal to the axis of motion 48 of the carriage 20. The arm 56 extends along the support member 62 and terminates in a bent portion 66 which engages a notch 68 at the top of a support member 62. The other arm 58 terminates in a curved portion 70, which nests within a narrow slot 72 in the carriage 20. As is best shown in FIGS. 4a and 5a, the curved portion 70 of the spring 52 rests upon an inclined surface within the slot 72. The inclined surface slopes downward toward the horizontal cylindrical post 60. When the head 14 is in its lowered position, as shown in FIG. 4a, the curved portion 70 of the spring 52 makes a point contact between the upper and lower ends of the inclined surface. As the head 14 is lowered, the curved portion 70 of the spring 52 rolls downward along the inclined surface. Accordingly, when the head 14 is in its raised position, as shown in FIG. 5a, the curved portion of the spring makes a point contact with the inclined surface at a point spaced somewhat closer to the lower end of the inclined surface. Thus, it will be appreciated, that the interaction of the curved portion of the spring and the inclined surface of the carriage provide a continuum of contact between the carriage and the spring resulting in the spring 52 being deflected only a small distance in relation to the displacement of the carriage 20.

Turning now to the operation of the head positioning apparatus 18, the head 20 is moved to a desired position relative to the tape 16 by rotating the stepper motor 26 a predetermined amount. The nut 76 is prevented from rotating along with the lead screw 24 by the engagement of the key 80 with the groove 88 on the carriage 20. The carriage 20 is prevented from rotating along with the lead screw 24 by the guide rods 40, 42. Thus, as the lead screw rotates 24, the lead screw 24 threads into the nut 76, and causes the carriage 20 to slide along the guide rods 40, 42 along the axis of motion 48. The rod 40 has a minimal clearance with the carriage 20 and thus primarily guides the carriage 20 and maintains the proper orientation of the carriage. More clearance is provided between the carriage 20 and rod 42, which primarily prevents rotation of the carriage 20.

The spring 52 biases the carriage 20 into engagement with the nut 76. The nut 76 in turn is biased relative to the lead screw 24 to eliminate clearance between the nut 76 and the lead screw 24. Also, the spring 52 biases the carriage 20 relative to the guide rods 40,42 to eliminate clearance or "play" therebetween which may allow undesired motion of the head 14.

Uniquely, the carriage 20 is not guided by the lead screw 24, nor prevented from rotating in an x-y plane. The lead screw 24 only provides a motive force on the carriage 20, through the nut 76. As discussed above, it is the guide rod 40 which primarily guides the carriage 20 in the sense of maintaining the proper orientation of the carriage 20 as the carriage 20 moves. Also, the rod 42 serves to prevent rotation of the carriage 20.

An advantage to guiding the carriage 20 with the rod 40 is that the clearance between the carriage 20 and the rod 40 can be much less than that between the nut 76 and the lead screw 24, since the nut 76 will bind if insufficient clearance is provided. Further, it is much simpler to fix the rod 40 in a desired orientation relative to a reference point that it is to permanently and properly orient the lead screw 24. This is because the lead screw 24 is subject to misalignment, eccentricity, and run-out, all of which will affect the orientation of the head 14. Additionally, the flange 74 may become slightly deflected upon attachment to the base plate 28, further adding variability to the orientation of the lead screw 24. By allowing the carriage 20 to float on the nut 76, the carriage 20 can be guided by the rod 40 even if the longitudinal axis 50 of the lead screw 24 is not truly parallel to the longitudinal axis 44 of the guide rod 40. Likewise, using the stationary rod 42 to prevent rotation of the carriage 20 results in greater precision than if the lead screw 24 were used for that purpose.

Figure 4B:
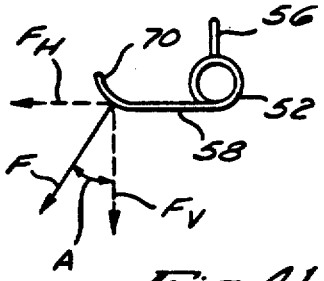

Another feature of the present invention is that the spring 52 causes a constant load to be applied to the motor 26, despite movement of the carriage 20 and variations in the spring force. When the head 14 is in a lowered position, as shown in FIG. 4a, the arm 58 of the spring 52 engages the carriage 20 and applies a force F. The force F is directed at an angle relative to the substantially vertical axis of motion 48 of the carriage 20. Referring now to FIG. 4b, an angle A represents the angle by which the force F deviates from the axis of motion 48 of the carriage 20. The force F is divided into two orthogonal components, a component $F_v$ which is vertically oriented and a component $F_H$ which is horizontally oriented. The component $F_V$ is substantially parallel to the axis of motion 48 of the carriage 20. As will be apparent to those skilled in the art, the values of the components $F_V$ and $F_H$ are functions of the angle A and the value of the force F.

Figure 5B:
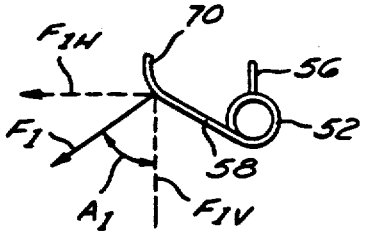

Turning now to FIGS. 5a and 5b, the head 20 is in a raised position as a result of the rotation of the lead screw 24. The collar 32 abuts the carriage 20 to limit the range of motion of the carriage 20. As the carriage 20 moves, the spring 52 becomes deflected. In particular, the arm 58 pivots about the post 60, resulting in a torsional deflection of the spring 52. The arm 58 now applies a force $F_1$ to the carriage 20. Referring to FIG. 5B, the force $F_1$ is directed at an angle $A_1$. The angle $A_1$ is greater than the angle A due to the movement of the carriage 20 and the resulting deflection of the spring 52. Since the force applied by the spring 52 is proportional to the degree of deflection of the spring 52, the force $F_1$ is greater than the force F. The force $F_1$ is divided into two orthogonal components, $F_{1V}$ and $F_{1H}$, which are parallel to the components $F_H$ and $F_V$ as shown in FIG. 4b. The component $F_{1V}$ is less than the component $F_V$, while the component $F_{1H}$ is greater than the component $F_H$.

Figure 7:
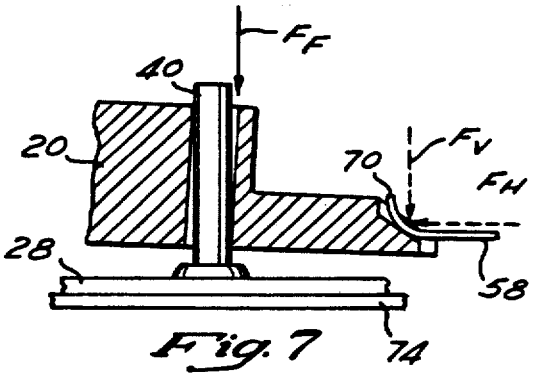
FIG. 7 is a cross-sectional view of the carriage taken through the bore in which the guide rod passes, showing the forces acting on the carriage.

FIG. 7 best shows the overall impact of the varying spring force F on the carriage 20. The component $F_H$ causes the carriage 20 to be biased into engagement with one side of the guide rod 40. The clearance between the carriage 20 and rod 40 are exaggerated for clarity. A vertical frictional force $F_F$ is generated as the carriage 20 slides along the rod 40. While other vertical friction forces (not shown) will be generated as the carriage 20 moves, they are insignificant relative to the friction force $F_F$. The friction force $F_F$ is a function of component $F_H$ and a coefficient of friction which is constant. Thus, as the component $F_H$ increases, so does the friction force $F_F$. A total force $F_T$ is equal to the sum of the friction force $F_F$ and the component $F_V$. The total force $F_T$ is vertically directed, that is, parallel to the direction of motion 48 of the carriage 20.

Advantageously, the total force $F_T$ remains substantially constant throughout the range of motion of the carriage 20. As discussed above, as the component $F_H$ increases, the component $F_V$ decreases. The increase in $F_H$, and therefore the increase in the friction force $F_F$ is compensated for by a decrease in the vertical component $F_V$. The total force $F_T$ is a measure of the resistance to motion of the carriage 20 and the resulting load on the motor 26 as the carriage 20 is moved. This resistance dampens oscillation of the lead screw 24 which is induced by overshooting of the motor 26. The stiffness of the spring 52 is chosen so that the force F will consistently provide the requisite amount of force to preload the lead screw 24 and motor 26. As a result, the head 14 will quickly settle at a desired position, enabling data to be recorded on the tape 16 at a high rate, and even while the head 14 is moving.

The precision capable with the present head 18 is evidenced by the fact that the head positioning apparatus has been used successfully to record as many as 15 tracks of data on ¼" wide tape 16. The apparatus 18 has also withstood vibration at a frequency of 500 hertz with up to 2 G's of acceleration without affecting the ability of the head 14 to read and write data. Further, the total force $F_T$ can be maintained at a constant value even though the spring 52 is small relative to the range of motion of the carriage 20. As a result, the head positioning apparatus 18 is compact and can be utilized in a tape drive 10 without jeopardizing compliance with industry standard dimensions.

As is best shown in FIG. 3, the head 14 is secured to a mounting plate 90. The mounting plate 90 is pivotably fastened to the carriage 20 by an elongated, cylindrical pin 92 which extends from the mounting plate 90 and passes through a pin hole 94 in the carriage 20. To prevent the pin 92 from sliding out of the pin hole 94, a cap 96 is pressed onto the end of the pin 92 which protrudes through the pin hole 94. The mounting plate 90 is pivotable about the pin 92 to adjust the orientation of the head 14 relative to the tape 16 in a direction referred to as the "azimuth".

To lock the mounting plate 90 in a desired position, a screw 98 is provided. The screw 98 passes through an elliptical opening 100 in the carriage 20 and is threaded into a threaded aperture 102 in the mounting place 90. The size and shape of the elliptical opening 100 allows sufficient clearance between the screw 98 and the carriage 20 so that when the screw 98 is loosened, the mounting plate 90 is permitted to pivot about the pin 92.

Figure 8:
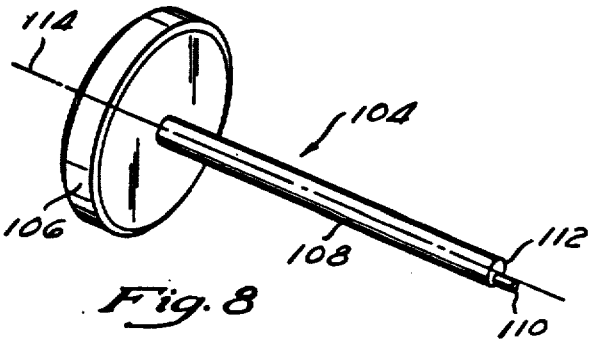
FIG. 8 is a perspective view of the tool used to adjust the orientation of the head.

A tool 104 for adjusting the orientation of the mounting plate 90 and head 14 is shown in FIG. 8. The tool 104 has a circular handle 106, and an elongated cylindrical stem 108 extending from the center of the handle 106. A cylindrical pin 110 is mounted on the end of the stem 108, spaced from a center 112 of the stem 108. The pin 110 protrudes outwardly, parallel to a longitudinal axis 114 of the stem 108.

The diameter of the stem 108 is sized to fit within an access hole 116 passing through the carraige 20. A smaller diameter access hole 118 is provided in the mounting plate 90, behind the access hole 116 in the carriage 20. The access hole 118 in the mounting plate 90 is sized to receive the pin 110 on the end of the stem 108. Although the access holes 116, 118 are not necessarily concentric, the holes 116, 118 are aligned so that the mounting plate hole 118 can be entered through the carriage hole 116.

To adjust the orientation of the head 14 using the tool 104, the screw 98 is first loosened to permit pivoting of the mounting plate 90. The stem 108 is then inserted within the carriage access hole 116, causing the pin 110 to enter the access hole 118 in the mounting plate 90. The handle 106 is manually grasped and rotated to cause the stem 108 to rotate about its longitudinal axis 114. Due to the eccentricity of the pin 110 relative to the stem 108, as the stem 108 is rotated, the pin 110 will cause the mounting plate 90 to pivot. When a desired orientation of the head 14 is achieved, the screw 98 is tightened to lock the mounting plate 90 in position.

Since the diameter of the handle 106 is large relative to the eccentricity of the pin 110, the handle 106 can be manually rotated to a significant degree while causing only a small change in the orientation of the mounting plate 90. Thus, manual rotation of the stem 108 results in precise positioning of the head 14. Further, the head 14 may be pivoted about the pin 92 without changing the orientation of the head 14 about any other axes.

What is claimed is:

1. An apparatus for movably mounting a magnetic head relative to a stationary base including a threaded lead screw which, when rotated, causes movement of the head relative to a magnetic data storage medium, said apparatus comprising:

a movable carriage on which the magnetic head is mounted;

a stationary guide attached to said stationary base and oriented substantially parallel to the longitudinal axis of said lead screw, said carriage being movable relative to said guide;

a threaded means adjacent said carriage for engaging said lead screw so that rotation of said lead screw causes said threaded means to slide said carriage relative to said guide along an axis substantially parallel to the longitudinal axis of said lead screw; and a coil spring having a longitudinal axis which is oriented substantially normal to the longitudinal axis of said lead screw for biasing said carriage relative to said threaded means and said guide to substantially eliminate clearance between said threaded means and said carriage, and between said guide and said carriage which may allow undesired motion of said head, said spring engaging said carriage such that motion of said carriage causes deflection of said spring, said spring applying a force to said carriage which is directed at an angle relative to the axis of motion of said carriage, the angular orientation and amount of said force varying as said carriage moves, said spring having a range of deflection such that the variation in the total spring force directed parallel to the axis of motion of said carriage due to the variation in the spring constant of said spring is substantially minimized, said force providing a resistance to rotation of said lead screw sufficient to dampen vibration of said head mounting apparatus.

2. The apparatus of claim 1 wherein said coil spring has a helically wound portion and an arm extending outwardly from each end of said wound portion, said wound portion surrounding a post which is fixed to a stationary support member mounted on said base, said post being oriented substantially normal to the longitudinal axis of said lead screw, one of said arms engaging said carriage and applying said force thereon, the other of said arms being secured to siad stationary support member.

3. The apparatus of claim 1, wherein said threaded means comprises a nut thread onto said lead screw, said spring biasing said carriage into engagement with said nut, said nut having a key which mates with a groove on said carriage so that said nut does not rotate about the longitudinal axis of said lead screw relative to said carriage.

4. The apparatus of claim 3 wherein said nut has a surface which engages said carriage, said surface being rounded to permit said carriage to float on said nut.

5. The apparatus of claim 1 wherein said guide comprises a stationary, cylindrical rod which extends through a bore in said carriage.

6. The apparatus of claim 1 wherein said head is pivotably mounted on said carriage so that the orientation of said head may be adjusted relative to said magnetic data storage medium.

7. The apparatus of claim 2, wherein the portion of said one of said areas of said coil spring engaging said carriage is curved and wherein the portion of said carriage engaged by said spring comprises a surface inclined downward toward said post, the interaction of said curved portion and said inclined surface upon the motion of said carriage causing said coil sprig to be deflected a relatively small distance relative the displacement of said carriage.

8. An apparatus for positioning a magnetic head relative to a magnetic data storage medium, said apparatus comprising:

a carriage on which the magnetic head is mounted, said carriage including at least one bore therein;

a stationary guide rod which passes through said bore, said carriage being slidable along said guide rod to vary the position of said head;

a drive means which engages said carriage and moves said carriage relative to said guide rod; and a biasing member for biasing said carriage relative to said drive means and said rod to substantially eliminate clearance between said drive means and said carriage and between said rod and said carriage which may allow undesired motion of said head, said biasing member applying a force to said carriage which is angled relative to an axis of motion of said carriage, movement of said carriage causing the angular orientation and the amount of said force to vary, said biasing member having a range of deflection such that the variation in the total force directed parallel to the axis of motion of said carriage due to the variation in the ratio of the force to the displacement of said biasing member is substantially minimized, throughout the range of motion of the carriage.

9. The apparatus of claim 8 wherein said biasing member has a longitudinal axis which is substantially normal to the axis of motion of said carriage.

10. The apparatus of claim 9 wherein said biasing force is generated by torsionally deflecting said biasing member.

11. The apparatus of claim 10 wherein said biasing member comprises a coil spring having a wound section and an arm protruding from each end of said wound section, one of said arms engaging said carriage to apply said force, the other of said arms engaging a stationary support member.

12. The apparatus of claim 8 wherein said drive means comprises:

a stepper motor and a lead screw, said motor causing a rotation of said lead screw, said lead screw being oriented substantially parallel to said guide rods; and a threaded means for engaging said lead screw so that rotation of said lead screw causes displacement of said carriage in a direction substantially parallel to the longitudinal axis of said guide rod.

13. The apparatus of claim 12, wherein said threaded means comprises a nut through which said lead screw is threaded, said nut mating with said carriage so that said nut does not rotate about the longitudinal axis of said lead screw relative to said carriage.

14. The apparatus of claim 11, wherein the portion of said one of said arms of said coil spring engaging said carriage is curved and wherein the portion of said carriage engaged by said spring comprises a surface incline toward said post, the interaction of said curved portion and said inclined surface upon the motion of said carriage causing said coil spring to be deflected a relatively short distance relative the displacement of said carriage.

15. An apparatus for mounting a magnetic head on a lead screw so that said lead screw moves the magnetic head relative to a magnetic data storage medium, said apparatus comprising:

a carriage on which the head is mounted;

means for guiding said carriage so that said carriage is movable along an axis substantially parallel to the longitudinal axis of the lead screw; and a biasing member which engages said carriage and biases said carriage relative to said guide means to substantially eliminate clearance between said guide means and said carriage which may allow undesired motion of said head, said biasing member having a longitudinal axis which is oriented substantially normal to the axis of motion of said carriage, said biasing member, in response to the torsional deflection of said biasing member, applying a force to said carriage which is angled relative to the axis of motion of said carriage, wherein the ratio of the force to the deflection of [the spring] *said biasing member* remains substantially constant.

16. The apparatus of claim 15 wherein said biasing member comprises a coil spring having a wound section through which said longitudinal axis passes, and an arm protruding from each end of said wound section, one of said arms engaging said carriage to apply said biasing force, the other of said arms engaging a stationary support member.

17. The apparatus of claim 15 wherein said guide means comprises at least one bore in said carriage, a stationary guide rod extending through said bore, said carriage being slideable relative to said rod, said rod being oriented substantially parallel to the longitudinal axis of said lead screw.

18. The apparatus of claim 16, wherein the portion of said one of said arm of said coil spring engaging said carriage is curved and wherein the portion of said carriage engaged by said spring comprises a surface inclined downward toward said longitudinal axis of said biasing member, the interaction of said curved portion and said inclined surface upon the motion of said carriage causing said coil spring to be deflected a relatively small distance relative the displacement of said carriage.

19. In a streaming cartridge tape drive having a magnetic read/write head and a motor which rotatably drives an externally threaded lead screw, an apparatus for mounting the magnetic head on the lead screw so that rotation of the lead screw causes movement of the head transverse to the elongate axis of a length of magnetic tape within the tape cartridge, said apparatus comprising:

a carriage on which the magnetic head is mounted, said carriage including at least one bore therein;

an internally threaded nut through which said lead screw is threaded, said nut mating with said carriage so that said nut does not rotate relative to said carriage about said lead screw, said carriage floating on said nut to compensate for misalignment of said lead screw;

a guide rod extending from said tape drive and passing through said bore, said guide rod oriented substantially parallel to the longitudinal axis of said lead screw, said carriage being slidable relative to said guide rod along an axis of motion substantially parallel to the longitudinal axis of said guide rod;

a torsional coil spring which biases said carriage relative to said nut and said guide rod to eliminate any clearance between said lead screw and said nut and between said carriage and said guide rod which may alloy undesired motion of said head, said torsional spring having a helically wound portion and two arms, one of said arms extending outwardly from each end of said wound portion, said wound portion being mounted on a post which is fixed to said tape drive, said post oriented substantially normal to the longitudinal axis of said lead screw, a first one of said arms engaging said carriage and applying a biasing force to said carriage, said biasing force being oriented at an angle relative to the axis of motion of said carriage, a second one of said arms secured to said tape drive so that movement of said carriage causes said first arm to pivot about said post and torsionally deflect said spring, causing the angular orientation and amount of said force to vary as said carriage moves, such that the variation in the total frictional and spring force directed parallel to the axis of motion of said carriage due to the variation in the spring constant of said spring is substantially minimized, said force providing enough resistance to the rotation of said lead screw sufficient to dampen vibration induced by said motor.

20. The apparatus of claim 19 wherein said head is secured to a mounting plate, said mounting plate being pivotably fastened to said carriage to allow adjustments in the orientation of siad head relative to said tape, a screw passing through said carriage and threading into said mounting plate to secure said head at a desired orientation.

21. The apparatus of claim 20 wherein the orientation of said head is adjustable with a tool having a stem and an eccentrically mounted pin protruding from the end of said stem and parallel to a longitudinal axis of the stem, wherein an access hole extends through said carriage, and a smaller diameter access hole is provided in said mounting plate, said mounting plate access hole being accessible through said carriage access hole, insertion of said stem into said carriage access hole causing said pin to enter said mounting plate access hole, rotation of said stem about its longitudinal axis causing said mounting plate to pivot.

22. The drive of claim 19, wherein said portion of said first one of said arms engaging said carriage is curved and wherein the portion of said carriage engaged by said torsional spring comprises a surface inclined downwards towards said post, the interaction of said curved portion and said inclined surface upon the motion of said carriage causing said coil spring to be deflected a relatively small distance relative the displacement of said carriage.

23. A method of positioning a magnetic head with a head positioning apparatus, said apparatus comprising a carriage on which said head is mounted, and having a threaded means which mates with a rotatable lead screw, said method comprising the steps of:

guiding said carriage along a stationary guide so that said carriage is movable along an axis substantially parallel to the longitudinal axis of said lead screw;

biasing said carriage relative to said threaded means and said guide with a biasing means to eliminate clearance between said threaded means and said carriage and between said carriage and said guide which may allow undesired motion of said head;

orienting said biasing means so that [the] *said* biasing means applies a force to the carriage which is angled relative to the axis of motion of said carriage;

rotating said lead screw to cause said carriage to move in a direction substantially parallel to the longitudinal axis of said lead screw; and varying the angular orientation and amount of said force as said carriage moves, such that the variation in the force directed parallel to the axis of motion of said carriage due to the variation in the ratio of the force to the deflection of [the spring] *said biasing means* is substantially minimized throughout the range of motion of said carriage.

24. The method of claim 23, further comprising the step of orienting said biasing [member] *means* so that a longitudinal axis of the biasing [member] *means* is substantially normal to the axis of motion of said carriage.

25. The method of claim 23 wherein said biasing means comprises a coil spring having a helically wound portion and an arm extending outwardly from each end of said wound portion, said method further comprising the step of mounting said wound portion on a stationary post, said post oriented substantially normal to the longitudinal axis of said lead screw, so that said coil spring is torsionally deflected as said carriage moves.

26. The method of claim 25, wherein one of said arms extending outwardly from said wound portion includes a curved portion and wherein said carriage includes an inclined surface, further comprising the step of rolling said curved portion along said inclined surface in response to the movement of said carriage along an axis substantially parallel to the longitudinal axis of said lead screw to substantially minimize the torsional deflection of said coil spring as said carriage moves.

* * * * *